No. 870,036. PATENTED NOV. 5, 1907.
J. H. KEETER.
SAW SET.
APPLICATION FILED MAY 28, 1907.
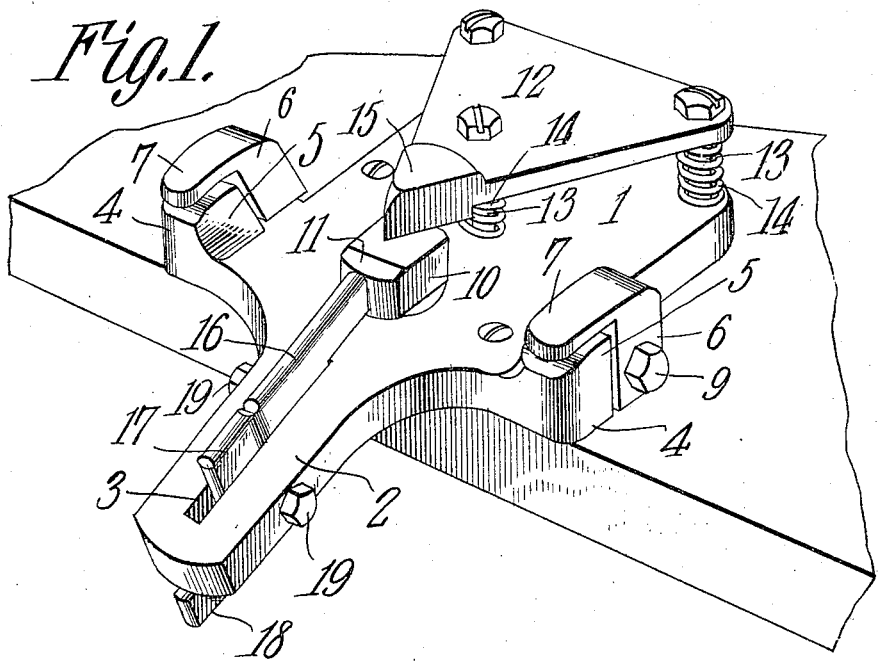
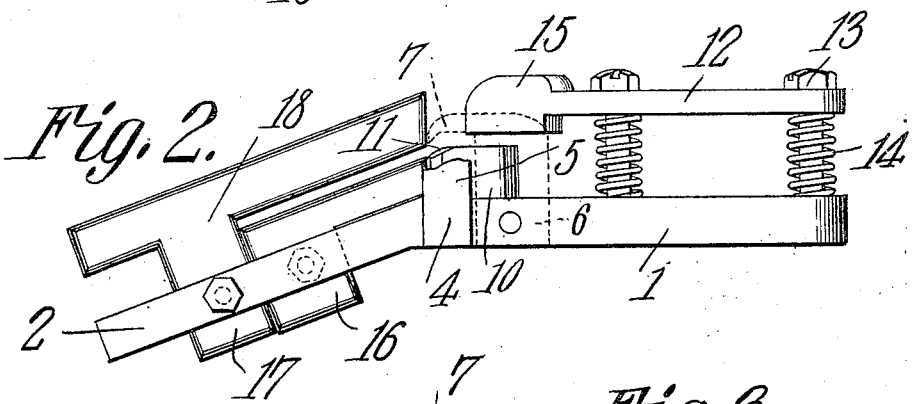
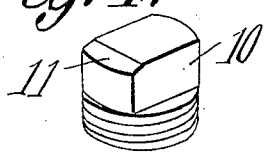
John H. Keeter,
INVENTOR.
By C. A. Snow & Co.
ATTORNEYS
WITNESSES:
E. H. Stewart
Herbert D. Lawson

UNITED STATES PATENT OFFICE.

JOHN H. KEETER, OF SPENCER, NORTH CAROLINA.

SAW-SET.

No. 870,036.　　　　Specification of Letters Patent.　　　　Patented Nov. 5, 1907.

Application filed May 28, 1907. Serial No. 376,129.

*To all whom it may concern:*

Be it known that I, JOHN H. KEETER, a citizen of the United States, residing at Spencer, in the county of Rowan and State of North Carolina, have invented a new and useful Saw-Set, of which the following is a specification.

This invention relates to saw sets and its object is to provide a simple and efficient device of this character which can be easily operated to set the teeth of saws of different sizes without danger of breaking or buckling the saw.

A still further object is to provide novel means for gripping a saw to hold it in position while being set, said means engaging the blade of the saw adjacent the teeth thereon so that any strain to which the saw may be subjected will be transmitted directly to the blade and not to the teeth thereon.

A still further object is to provide saw gripping means which are adjustable to blades of different thicknesses and which permit a blade to be slipped longitudinally therethrough so as to bring the teeth successively into position above the anvil and beneath the setting nose.

Another object is to provide a rest for holding small saws at the proper angle to the anvil, said rest being capable of adjustment and a portion thereof being also designed for use as a guard to prevent a small saw blade from buckling during the setting operation.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a perspective view of the saw set. Fig. 2 is a side elevation thereof, the blade gripping devices being dotted and one of the rest members being shown in position to constitute a guard. Fig. 3 is a detail view of one of the blade gripping members. Fig. 4 is a detail view of the removable anvil.

Referring to the figures by characters of reference, 1 designates the base of the device the same being provided at one edge with a downwardly inclined tongue 2 formed with a longitudinal slot 3. Lateral extensions 4 are formed with the base 1 adjacent the tongue 2 and each of these extensions has an integral upstanding block 5 the upper face of which is rounded as shown particularly in Fig. 1 and constitutes the fixed jaw of the blade gripping means. Coöperating with each of the blocks 5 is an adjustable blade gripping member comprising a base 6 having a curved gripping tongue 7 extending from the upper end thereof and disposed to lap the curved end of the block 5. Each base 6 is disposed in rear of the extension 4 and is provided with a large transverse aperture 8 designed to receive a screw 9 engaging the base 1. The diameter of the screw is less than that of aperture 8 so that when the screw is loosened it is possible to adjust the movable gripping member vertically and also toward or away from the block 5.

Interposed between the blocks 5 and formed with or secured to the base 1 is an anvil 10 having its upper face slightly beveled at the front end thereof as shown at 11. This anvil is overhung by one corner of a triangular plate 12 movably mounted upon posts 13 upstanding from the base. Springs 14 are interposed between the base and plate and surround the posts. That portion of the plate overhanging the anvil is thickened as shown at 15 and constitutes the setting nose of the device.

The slot 3 is designed to receive one or more rest members and in Figs. 1 and 2 two of these members have been shown. One of the members is preferably substantially L-shaped as shown at 16, one arm being designed to extend into the slot 3 while the other arm is disposed above the tongue 2 and close to the anvil so as to constitute a rest for a small saw. This rest can be enlarged by inserting through the slot the shank 17 of a second rest member 18 which is substantially T-shaped. This position of the member 18 has been illustrated in Fig. 1. If preferred, however, the member 18 can be placed with its shank extending downward into slot 3 as shown in Fig. 2 so that the upper portion of the member will extend above and parallel with the member 16 and act as a guard to prevent small blades from buckling while the teeth are being set. Set screws 19 are provided within the tongue 2 for locking the two rest members in any positions to which they may be adjusted.

When it is desired to set the teeth of a small saw the rest members are adjusted to the positions shown in Fig. 2 and the blade of the saw is inserted between the two members so that one or more teeth will rest upon the anvil 10. The adjustable gripping members are then shifted until the free ends of the tongues 7 bind upon the saw blade. Said adjustable members are then secured by means of the screws 9. By striking the nose the same will be brought against the teeth or tooth thereunder and will bend it onto the anvil 10. The blade can then be slid longitudinally to bring one or more teeth into position under the nose whereupon the operation can be repeated.

It will be seen that the tongues 7 bind upon the saw back of the teeth so that there is no danger of the teeth being broken off at the points where the saw is held. When the device is used for setting the teeth of large saws either or both of the rests can be dispensed with as the weight of the saw blade will be sufficient to hold it in proper position.

As shown in Fig. 4 the anvil is provided with a screw threaded shank 20 designed to be screwed into a threaded opening formed in the base 1. This anvil can be readily removed when worn and a new one substituted therefor. It is of course understood, however, that the anvil can be formed integral with the base if desired. It will be noted that the removable anvil has its opposite faces flattened so that it can be readily engaged by a wrench to facilitate the removal of the anvil.

What is claimed is:

1. In a saw set the combination with a base having an inclined tongue and setting means carried by the base; of angular rest members adjustably connected to the tongue, one of said members being reversible and disposed to constitute a guard and to lap a saw, and means for detachably securing the members to the tongue.

2. The combination with a base; of laterally extending fixed blade engaging devices upon the base, blocks adjustably connected to the base, and tongues extending from the blocks and overhanging said fixed members, the adjoining faces of said members and tongues being curved.

3. A saw set comprising a base, posts upstanding therefrom, a triangular plate slidably mounted upon the posts, yieldable supports upon the posts and interposed between the base and plate, one corner of the plate constituting a setting nose, and an anvil upon the base and below the setting nose.

4. A saw set comprising a base, a longitudinally slotted inclined tongue extending therefrom, an anvil upon the base, a setting nose coöperating therewith, and adjustable angular saw rests secured within the slotted tongue and extending close to the anvil, one of said rests being disposed to extend over a saw blade and constitute a guard.

In testimony that I claim the foregoing as my own, I have hereto affixed my signature in the presence of two witnesses.

JOHN H. KEETER.

Witnesses:
  J. H. SULLIVAN,
  L. S. KEETER.